United States Patent
Kim et al.

(10) Patent No.: US 8,386,813 B2
(45) Date of Patent: Feb. 26, 2013

(54) APPARATUS AND METHOD FOR SUPPORTING SELECTIVE SUSPEND MODE OF USB NETWORK-DEVICE

(75) Inventors: Jae-Mok Kim, Suwon-si (KR); Jeong-Hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 12/653,503

(22) Filed: Dec. 15, 2009

(65) Prior Publication Data
US 2010/0162022 A1    Jun. 24, 2010

(30) Foreign Application Priority Data
Dec. 18, 2008    (KR) .................. 10-2008-0129013

(51) Int. Cl.
*G06F 1/00*    (2006.01)
*G06F 1/26*    (2006.01)
(52) U.S. Cl. ........ 713/300; 713/320; 713/323; 713/324; 713/330; 714/15; 714/21
(58) Field of Classification Search .................. 713/300, 713/320, 323, 324, 330; 714/15, 21
See application file for complete search history.

(56) References Cited

U.S. PATENT DOCUMENTS

| 7,373,530 B2 * | 5/2008 | Judge et al. ................ 713/300 |
| 2004/0213289 A1 * | 10/2004 | Liu et al. ................ 370/469 |
| 2008/0072086 A1 * | 3/2008 | Kim ........................ 713/323 |

FOREIGN PATENT DOCUMENTS
KR    10-2008-0055602    6/2008

* cited by examiner

*Primary Examiner* — Kim Huynh
*Assistant Examiner* — Michael J Brown (57) ABSTRACT

A host computer equipment includes an apparatus configured to perform a method for supporting a selective suspend mode of a Universal Serial Bus (USB) network-device. The host includes a power manager, a status manager, and a USB driver. When there is a transition to a host suspend mode, the power manager delivers a host suspend mode notification message to the status manager. The status manager delivers a status transition message of instructing a normal status (D0) transition to the USB driver. The USB driver makes a power status of the USB network-device transit to a normal status (D0), notifies the power manager of the status transition to the normal status (D0), and makes the power status of the USB network-device transit from the normal status (D0) to a power off status (D3).

20 Claims, 5 Drawing Sheets

APPARATUS AND METHOD FOR SUPPORTING SELECTIVE SUSPEND MODE OF USB NETWORK-DEVICE

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Dec. 18, 2008 and assigned Serial No. 10-2008-0129013, the entire disclosure of which is hereby incorporated by reference.

TECHNICAL FIELD OF THE INVENTION

The present invention relates to an apparatus and method for controlling a current consumption of a Universal Serial Bus (USB) network-device connected to a host. More particularly, the present invention relates to an apparatus and method for supporting a selective suspend mode of a USB network-device that is connected to a host using a Windows Operating System (OS).

BACKGROUND OF THE INVENTION

USB is a standard for connecting a host, such as a Personal Computer, with an external hardware. The external hardware of a USB scheme physically connects with the host through a USB port of the host. The host supplies power to the external hardware through the USB port. If no signal is exchanged between the host and the external hardware during a predetermined time, the USB port operates in a selective suspend mode. The selective suspend mode is a mode for, when no signal is transmitted and received, reducing an amount of current consumption to 1 mA or less and, thus, saving a battery of the host. Additionally, the selective suspend mode of the USB port is disabled when an external input by a user is generated.

For example, a mouse is described below. If the mouse does not operate during a determined time, the mouse enters a selective suspend mode. At this time, if a user moves the mouse, that is, if there is an external input, the selective suspend mode is disabled. A general procedure for transiting to the selective suspend mode is described below. The USB device informs a device driver of the host regarding a status transition and then, the device driver informs a USB root hub driver regarding the status transition. Then, the USB root hub driver sends an acceptance request for status transition to other devices installed in its own port and, upon receiving an acceptance for status transition, informs the device driver of the acceptance for status transition. Then, the device driver again informs the USB device regarding the acceptance for status transition, and the USB device transits to the selective suspend mode. If the acceptance for status transition is not received during a set time, the USB device cannot transit to the selective suspend mode.

Alternatively, when there is a transition to a suspend status, a Windows OS of the host informs each device driver of the status transition. That is, the Windows OS enters a host suspend mode after sending a power status setup (SetPower) notification message to the device driver in a power manager within the Windows OS and making a corresponding USB device transit to 'D3' (that is, a power off status).

A power status of the USB device is mainly divided into a normal operation status (D0), an idle status (D2), and a power off status (D3). The 'D0' can transit to the 'D2' and 'D3', but the 'D2' and 'D3' are permitted to transit only to the 'D0'.

Thus, in the case of powering off the USB device, if the power status of the USB device is equal to 'D2', the USB device has to transit to the 'D3' after transiting to the 'D0'.

However, if a USB device is equal to a USB network-device (such as a Worldwide Interoperability for Microwave Access (WiMAX) modem), when entering a host suspend status, a current Window OS enters a host suspend mode after sending a SetPower (D3) notification message to a USB driver. At this time, if a power status of the USB network-device is equal to 'D2', a status transition error takes place because it is not permitted to transit from the 'D2' to the 'D3' on a standard. Thus, a USB bus (that is, a USB driver) and Internet Protocol (IP) stack within the Windows OS maintain the 'D2' for the USB network-device. Thereafter, if the host transits to a normal status (D0), the USB network-devices are all restored to the normal status (D0). However, a problem exist in that, because the IP stack within the Windows OS recognizes that the USB network-device does not awake from a selective suspend mode, it fails to transmit packets generated in the host to the USB network-device.

In order to provide a solution to the above problem, a way not to support a selective suspend mode for a USB network-device has been proposed. However, in this case, a problem exists in that, because the USB network-device always operates in a normal mode, a battery consumption of a host greatly increases. Thus, there is a need for a way to support a selective suspend mode for a USB network-device with no trouble in interaction with a host OS.

SUMMARY OF THE INVENTION

To address the above-discussed deficiencies of the prior art, it is a primary aspect of the present invention to provide an apparatus and method for supporting a selective suspend mode of a Universal Serial Bus (USB) network-device connected to a host.

Another aspect of the present invention is to provide an apparatus and method for, upon entering a host suspend status, controlling a power status of a USB network-device.

A further aspect of the present invention is to provide an apparatus and method for reducing a battery consumption of a host connected with a USB network-device.

Yet another aspect of the present invention is to provide an apparatus and method for allowing a host and a USB network-device to communicate with no error.

The above aspects are achieved by providing an apparatus and method for supporting a selective suspend mode of a USB network-device.

According to one aspect of the present invention, a host equipped with a Universal Serial Bus (USB) network-device is provided. The host includes a power manager, a status manager, and a USB driver. When a transition to a host suspend mode exists, the power manager delivers a host suspend mode notification message to the status manager. Upon receiving the host suspend mode notification message from the power manager, the status manager delivers a status transition message of instructing a normal status (D0) transition, to the USB driver. In response to the status transition message, the USB driver makes a power status of the USB network-device transit to a normal status (D0), notifies the power manager of the status transition to the normal status (D0), and, upon receiving a SetPower notification message resulting from the host suspend mode transition from the power manager, causes the power status of the USB network-device to transit from the normal status (D0) to a power off status (D3).

According to another aspect of the present invention, a method for supporting a selective suspend mode of a USB network-device in a host is provided. The method includes, in a power manager, delivering a host suspend mode notification message to a status manager when there is a transition to a host suspend mode and, in the status manager, upon receiving the host suspend mode notification message, delivering a status transition message of instructing a normal status (D0) transition to a USB driver and, in the USB driver, making a power status of the USB network-device transit to a normal status (D0) in response to the status transition message and, in the USB driver, notifying the power manager of the status transition to the normal status (D0) and, in the USB driver, upon receiving a SetPower notification message resulting from the host suspend mode transition from the power manager, making the power status of the USB network-device transit from the normal status (D0) to a power off status (D3).

According to a further aspect of the present invention, an operation method of a power manager in a host equipped with a USB network-device is provided. The method includes sending a host suspend mode notification message to a status manager when there is a transition to a host suspend mode, the status manager instructing a USB driver to perform a normal status (D0) transition in response to the host suspend mode notification message, receiving a report that a power status of the USB network-device is equal to a normal status (D0) from the USB driver, and sending a SetPower notification message to the USB driver and making the power status of the USB network-device transit to a power off status (D3).

According to yet another aspect of the present invention, an operation method of a status manager in a host equipped with a USB network-device is provided. The method includes checking if a host suspend mode notification message is received from a power manager and, upon receiving the host suspend mode notification message, sending a status transition message of instructing a normal status (D0) transition.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The following description is made for an apparatus and method for supporting a selective suspend mode of a modem termination connected to a Universal Serial Bus (USB) port of a host.

For example, the host can be any computer equipment with USB terminals such as Personal Computers (PCs), notebook-sized personal computers, and so forth. Also, the modem termination, which is a communication modem equipment detachable from an external input/output terminal (such as a USB terminal) of the host, can be, for example, an equipment including an Institute of Electrical and Electronics Engineers (IEEE) 802.16-based communication modem (such as a Worldwide Interoperability for Microwave Access (WiMAX) modem, and the like), a Digital Multimedia Broadcasting (DMB) receiving modem, a High Speed Downlink/Uplink Packet Access (HSDPA/HSUPA) communication modem, and the like.

Prior to a description of the present invention, a description of a power management status of a Windows Operating System (OS) is made as follows:
  S1: Normal operation status
  S2: Status of operating screen saver because there is no use by user during specific time
  S3: Host suspend (standby) status (partial power off status, and possible immediate transition to 'S1')
  S4: Host suspend (hibernate) status (status of powering off after backing up all data in storage unit)
  S5: PC power-off status.

A description of a power status of a USB device is made as follows:
  D0: Normal operation status
  D2: Idle status (status of no device operation)
  D3: Power off status (status of device power cutoff).

Here, the 'D0' can transit to the 'D2' and 'D3', but the 'D2' and 'D3' are permitted to transit only to the 'D0'.

Figure 1:
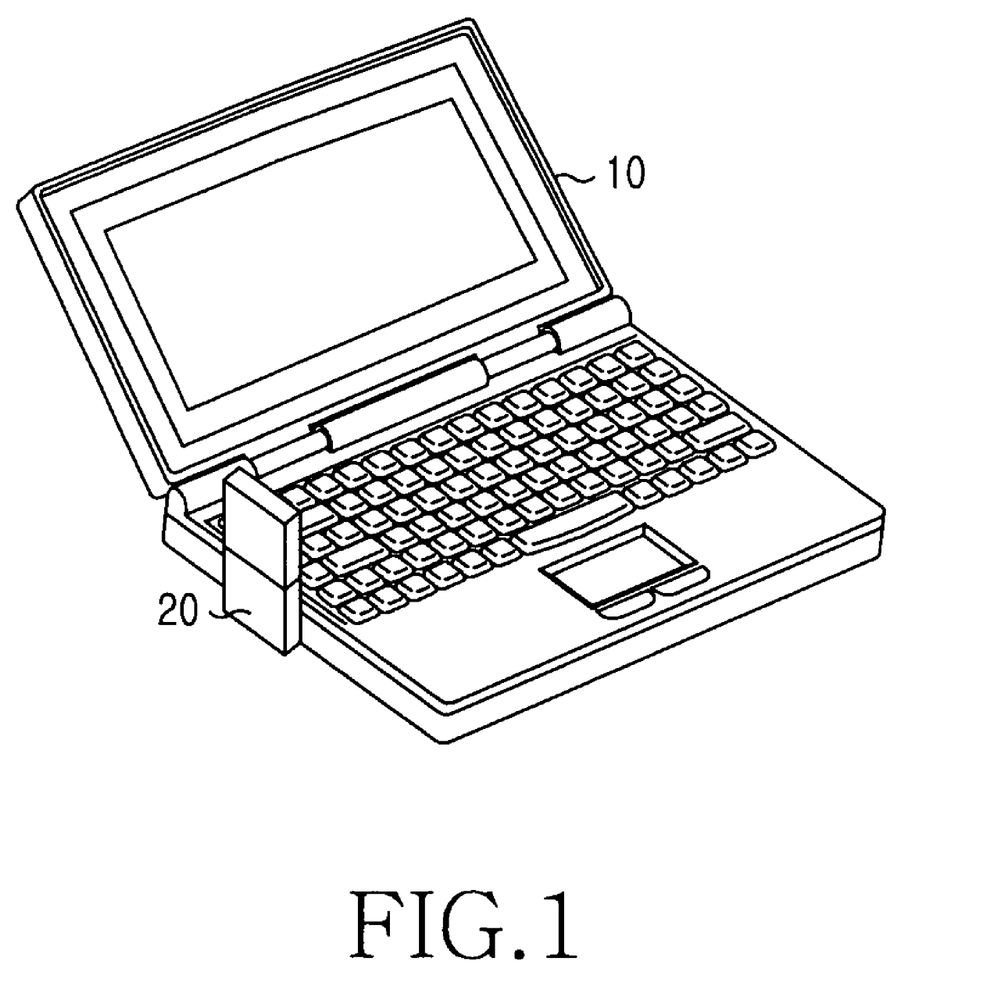
FIG. 1 illustrates a host equipped with a Universal Serial Bus (USB) network-device according to the present invention.

FIG. 1 illustrates a host equipped with a USB network-device according to the present invention.

As illustrated in FIG. 1, the host 10 can be a portable notebook computer, and the USB network-device 20 can be installed at a USB terminal of the host 10. The USB network-device 20 is a modem device supporting a specific communication standard (such as IEEE 802.16e, Wireless Broadband (WiBro)). The USB network-device 20 demodulates a signal received through an antenna and provides the demodulated signal to the host 10, and modulates transmission packets from the host 10 and transmits the modulated packets through the antenna. When there is no communication during a predetermined time, the USB network-device 20 can enter an idle status in compliance with a corresponding communication standard. The idle status can be called a suspend status, a dormant status, and so forth, in compliance with a communication standard applied.

If entering the idle status, the USB network-device 20 informs a device driver (such as a USB driver) of the host 10 of a status transition. Thus, the device driver informs a USB root hub driver of a selective suspend mode transition. Then, the USB root hub driver acquires an acceptance for selective suspend mode transition from devices installed in its own port and then, informs the device driver of the acceptance for selective suspend mode transition. Thus, the device driver informs the USB network-device 20 of the acceptance of selective suspend mode transition. By this, the USB network-device 20 can transit to a selective suspend mode.

A case in which the host enters a host suspend mode while the USB network-device 20 is in the selective suspend mode is described below in detail.

An exemplary embodiment of the present invention is to, before a USB device driver receives a power status setup (SetPower) notification message of instructing a power off status (D3) transition from a power manager of an OS, make a power status of a corresponding USB device transit to the 'D3' through an agent of an application level. In the following description, the agent is named as a "status manager".

Figure 2:
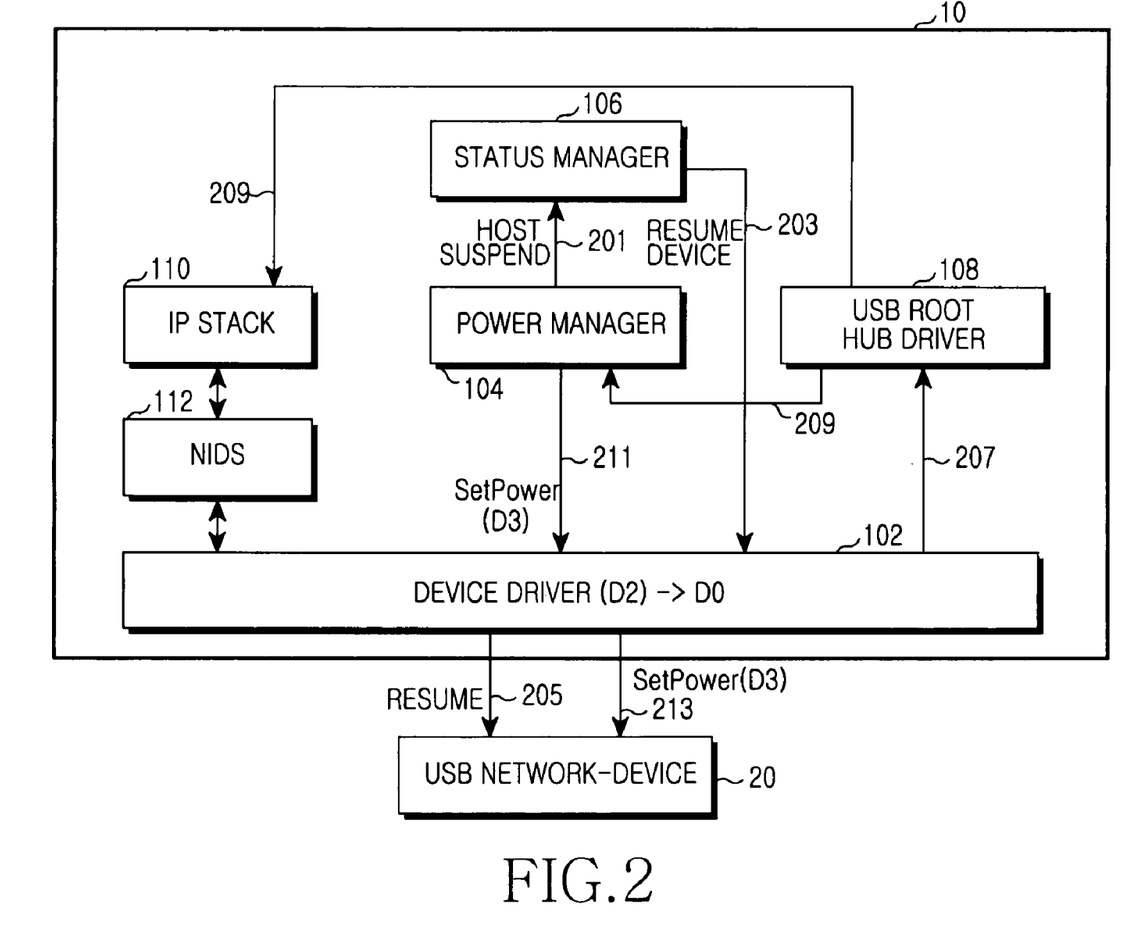
FIG. 2 illustrates an internal construction of a host equipped with a USB network-device according to an exemplary embodiment of the present invention.

FIG. 2 illustrates an internal construction of a host equipped with a USB network-device according to an exemplary embodiment of the present invention.

As illustrated in FIG. 2, the USB network-device 20 connects to a device driver 102 of the host 10. The host 10 includes the device driver 102, a power manager 104, a status manager 106, a USB root hub driver 108, an Internet Protocol (IP) stack 110, and a Network Interface Driver Subsystem (NIDS) 112.

Here, the USB network-device 20 physically connects to the host 10 through a USB port. The host 10, a device using a Windows OS, complies with a network driver interface standard for defining an interface between a Windows networking software component provided by Microsoft Corporation and the USB network-device 20. For the sake of this, in compliance with the network driver interface standard, the NIDS 112 converts packets from the USB network-device 20 and forwards the packets to the IP stack 110 and, in compliance with the standard, converts packets from the IP stack 110 and delivers the converted packets to the USB network-device 20.

An operation of the above-constructed host of FIG. 2 according to an exemplary embodiment of the present invention is described below.

When there is a transition to a host suspend mode, in step 201, the power manager 104 delivers a host suspend mode notification message to the status manager 106. Then, in step 203, the status manager 106 delivers a status transition message of instructing a normal status (D0) transition to the device driver 102. In response to this, the device driver 102 causes a power status of the USB network-device 20 to transit to the 'D0'. At this time, if the power status of the USB network-device 20 is equal to 'D2', in step 205, the device driver 102 causes the power status of the USB network-device 20 to transit from the 'D2' to the 'D0'. If the power status transits from the 'D2' to the 'D0' as above, in step 207, the device driver 102 informs the USB root hub driver 108 of the status transition. Then, in step 209, the USB root hub driver 108 informs the power manager 104 and the IP stack 110 of the reported status transition.

Alternatively, after informing all applications of the host suspend mode transition, in step 211, the power manager 104 delivers a SetPower notification message of instructing a power off status (D3) transition to each device driver. If then, in step 213, the device driver 102 causes the power status of the USB network-device 20 to transit from the 'D0' to the 'D3'. At this time, the USB network-device 20 can transit to the 'D3' with no error because the USB network-device 20 has transited to the 'D0' before receiving the SetPower notification message of instructing the power off status (D3) transition.

Figure 3:
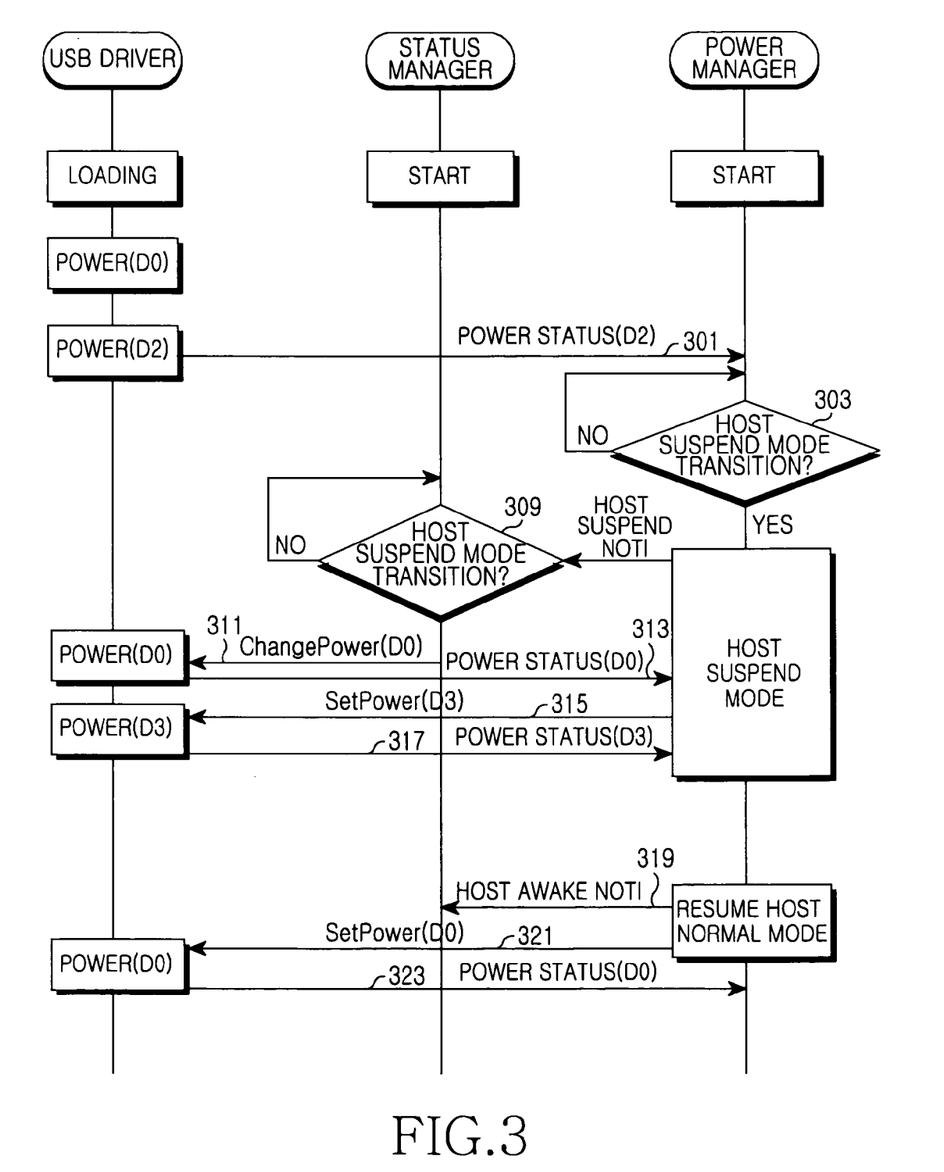
FIG. 3 illustrates a ladder diagram for an internal signaling procedure in a host connected with a USB network-device according to an exemplary embodiment of the present invention.

FIG. 3 illustrates an internal signaling procedure in a host connected with a USB network-device according to an exemplary embodiment of the present invention.

Referring to FIG. 3, if the host powers on, an OS is initiated. At this time, the USB driver 102 performs loading and then, transits to a normal status (D0). Thereafter, the USB driver 102 transits to an idle status (D2) and, in step 301, reports that a power status of a USB device is equal to the idle status (D2), to the power manager 104.

Alternatively, in step 303, the power manager 104 checks if the host transits to a host suspend status. If the host transits to a host suspend mode, in step 307, the power manager 104 informs the status manager 106 of the host suspend mode transition.

In step 309, the status manager 106 checks if a host suspend mode notification message is received from the power manager 104. If the host suspend mode notification message is received, that is, if the host suspend mode transition is detected, in step 311, the status manager 106 delivers a status transition message of instructing a normal status (D0) transition, to the USB driver 102.

In response to the status transition message, the USB driver 102 causes a power status of the USB network-device 20 to transit to the normal status (D0). Then, in step 313, the USB driver 102 delivers a power status message of notifying that the USB network-device 20 is in the normal status (D0), to the power manager 104.

Alternatively, when there is a transition to a host suspend mode, the power manager 104 informs all applications of the host suspend mode transition. And, in step 315, the power manager 104 delivers a SetPower notification message of instructing a power off status (D3) transition, to the USB driver 102. In response to this, the USB driver 102 causes the power status of the USB device to transit from the normal status (D0) to a power off status (D3). Additionally, in step 317, the USB driver 102 delivers a power status message of reporting that the USB device is in the power off status (D3), to the power manager 104. Because the power status of the USB device has already transited to the normal status (D0) by the status manager 106, the USB device can transit to the power off status (D3) without an error when the host transits to the host suspend mode.

Thereafter, if the host transits to a normal status (D0), in step 319, the power manager 104 delivers a host awake notification message to the status manager 106. Then, in step 321, the power manager 104 delivers a SetPower (D0) notification message to the USB driver 102. In response to this, the USB driver 102 makes the power status of the USB device transit to the normal status (D0). Then, in step 323, the USB driver 102 delivers a power status message of informing that the USB device is in the normal status (D0), to the power manager 104.

In FIG. 3, for description convenience, it is described that a power status message of informing a power status of the USB device 20 is directly delivered from the USB driver 102 to the power manager 104. Unlike this, as described above in FIG. 2, the power status message can be delivered from the USB driver 102 to the power manager 104 via the USB root hub driver 108.

Figure 4:
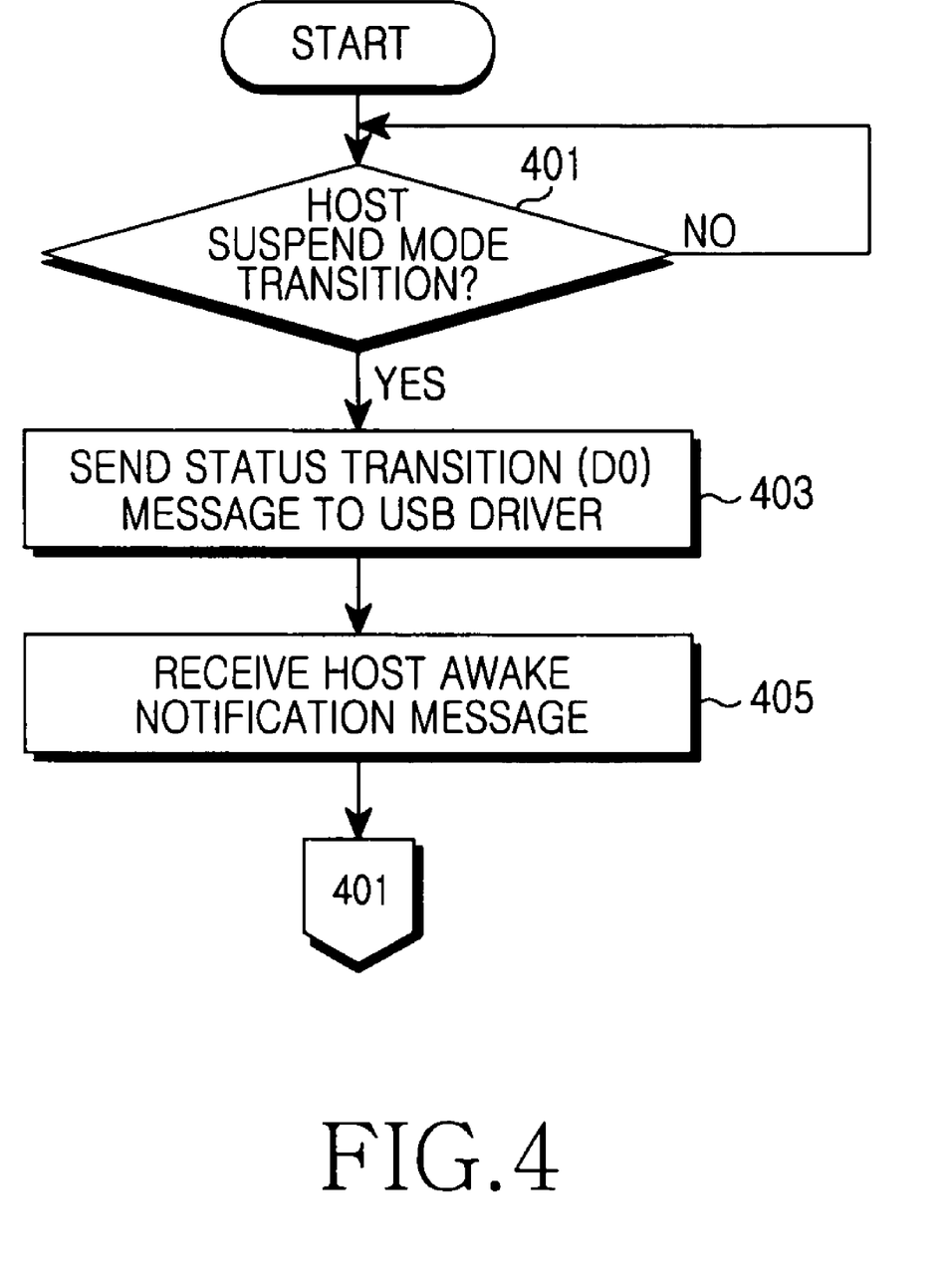
FIG. 4 illustrates an operation procedure of a status manager in a host connected with a USB network-device according to an exemplary embodiment of the present invention.

FIG. 4 illustrates an operation procedure of a status manager in a host connected with a USB network-device according to an exemplary embodiment of the present invention.

Referring to FIG. 4, in step 401, the status manager 106 checks if the host transits to a host suspend mode. That is, the status manager 106 checks if a host suspend mode notification message is received from the power manager 104. If the host suspend mode notification message is received, the status manager 106 proceeds to step 403 and delivers a status transition message of instructing a normal status (D0) transition, to the USB driver 102.

Then, in step 405, the status manager 106 checks if a host awake notification message is received from the power manager 104 and, if the host awake notification message is received, recognizes that the host transits to a normal mode. Then, the status manager 106 returns to step 401 to again check if the host transits to the host suspend mode.

Figure 5:
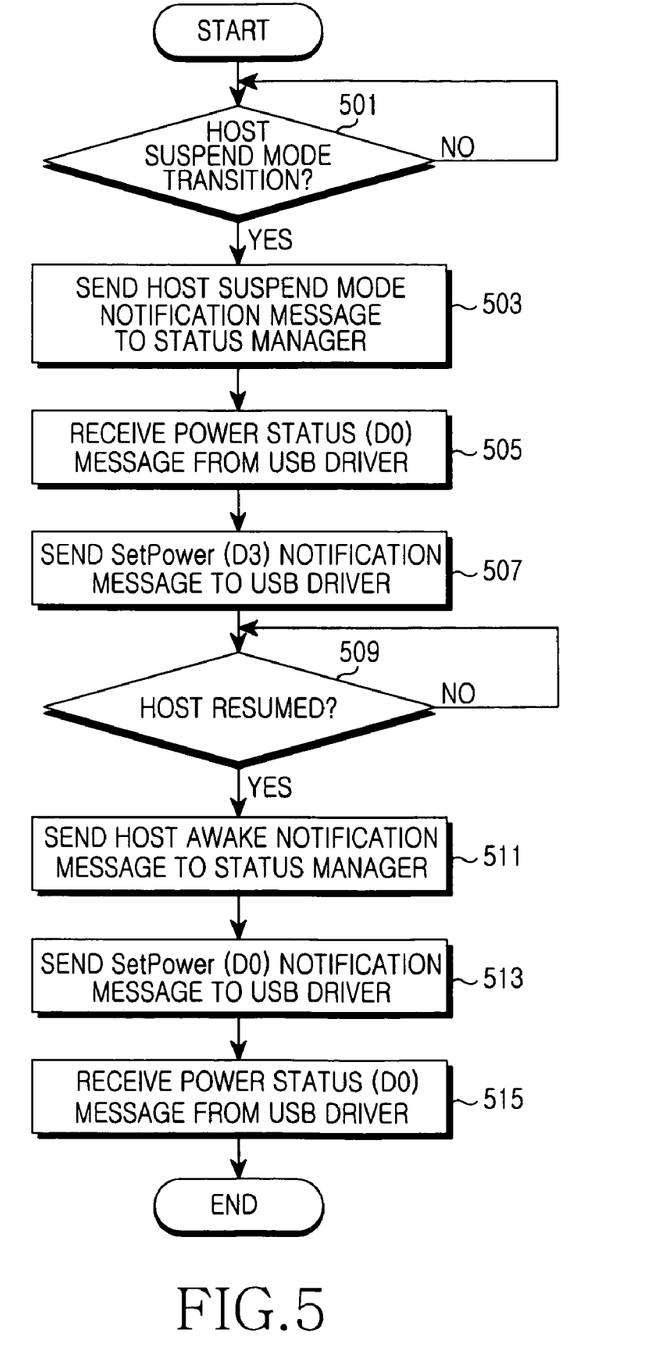
FIG. 5 illustrates an operation procedure of a power manager in a host connected with a USB network-device according to an exemplary embodiment of the present invention.

FIG. 5 illustrates an operation procedure of a power manager in a host connected with a USB network-device according to an exemplary embodiment of the present invention.

Referring to FIG. 5, in step 501, the power manager 104 checks if the host transits to a host suspend mode. If the host transits to the host suspend mode, in step 503, the power manager 104 delivers a host suspend mode notification message to the status manager 106, thus informing all applications of the host suspend mode transition.

Then, in step 505, the power manager 104 receives a power status message of informing that a corresponding USB device is in a normal status (D0), from the USB driver 102. In step 507, the power manager 104 delivers, to the USB driver 102, a SetPower notification message of instructing a power off status (D3) transition resulting from the host suspend mode transition. As such, after cutting off power supplied to the USB device, the host enters the host suspend mode.

During execution of the host suspend mode, in step 509, the power manager 104 checks if the host transits to a normal mode. If the host resumes in the normal mode, the power manager 104 proceeds to step 511 and delivers a host awake notification message to the status manager 106. Then, in step 513, the power manager 104 delivers a SetPower notification (D0) message to the USB driver 102 and, in step 515, receives a power status message of informing that a corresponding USB device is in a normal status (D0), from the USB driver 102.

Table 1 below shows the comparison result between a current consumption (i.e., a battery life) of a host in case of supporting a selective suspend mode for a USB network-device according to the aforementioned exemplary embodiment of the present invention and a conventional scheme. In Table 1, the conventional scheme represents a scheme of not supporting a selecting suspend mode for a USB network-device. This experiment was carried out after a Samsung Electronics notebook computer (SENS-Q1U) is equipped with an M-WiMAX terminal (that is, a modem) of a USB Dongle type.

TABLE 1

| | Conventional scheme | Present invention | Expected effects |
|---|---|---|---|
| Consumption current | 40 mA | 1 mA or less | Reduction to 1/40 |
| Battery life | 2 hours and 40 minutes (160 minutes) | 4 hours and 30 minutes (270 minutes) | Increase by 68% |

As described above, an exemplary embodiment of the present invention has an advantage of, by supporting a selective suspend mode for a USB network-device connected to a host, being capable of remarkably reducing a battery consumption amount of the host. Also, the exemplary embodiment of the present invention has an advantage of, by solving a trouble in interaction between the host and the USB device, being capable of delivering packets from the host to the USB device with no error.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A host equipped with a Universal Serial Bus (USB) network-device, the host comprising:
a power manager configured to deliver a host suspend mode notification message to a status manager upon a transition to a host suspend mode, and, upon receiving a notification from a USB driver of a status transition to a normal status (D0), send a SetPower notification message to the USB driver to power off;
the status manager configured to deliver a status transition message instructing the USB driver to transition to the normal status (D0) upon receiving the host suspend mode notification message from the power manager; and
the USB driver configured to, in response to the status transition message, cause a power status of the USB network-device to transition to the normal status (D0), notify the power manager of the status transition to the normal status (D0), and, upon receiving the SetPower notification message resulting from the host suspend mode transition from the power manager, cause the power status of the USB network-device to transition from the normal status (D0) to a power off status (D3).

2. The host of claim 1, wherein the status manager is an agent of an application level.

3. The host of claim 1, further comprising a USB root hub driver configured to receive a report on the power status of the USB network-device from the USB driver, and notify the power manager and an Internet Protocol (IP) stack of the power status of the USB network-device.

4. The host of claim 3, further comprising:
the IP stack configured to store packets received from the USB network-device and packets transmitted to the USB network-device; and
a Network Interface Driver Subsystem (NIDS) configured to interface between the IP stack and the USB driver.

5. The host of claim 1, wherein the power manager is configured to inform all applications of the host suspend mode transition, and deliver the SetPower notification message of instructing the power off status (D3) transition, to the USB driver.

6. The host of claim 1, wherein the host is a computer equipped with a Windows Operating System (OS).

7. The host of claim 1, wherein the USB network-device is a terminal comprising at least one of an Institute of Electrical and Electronics Engineers (IEEE) 802.16-based communication modem, a Digital Multimedia Broadcasting (DMB) receiving modem, and a High Speed Downlink/Uplink Packet Access (HSDPA/HSUPA) communication modem.

8. A method of supporting a selective suspend mode of a Universal Serial Bus (USB) network-device in a host, the method comprising:
delivering a host suspend mode notification message, by a power manager, to a status manager when there is a transition to a host suspend mode;
delivering, by the status manager, a status transition message instructing a USB driver to transition to a normal status (D0) upon receiving the host suspend mode notification message;
transitioning, by the USB driver, a power status of the USB network-device transit to the normal status (D0) in response to the status transition message;
notifying, by the USB driver, the power manager of the status transition to the normal status (D0); and
transitioning, by the USB driver, the power status of the USB network-device from the normal status (D0) to a power off status (D3) upon receiving a SetPower notification message resulting from the host suspend mode transition from the power manager.

9. The method of claim 8, wherein the status manager is an agent of an application level.

10. The method of claim 8, further comprising:
sending, by the USB driver, a report on the power status of the USB network-device to a USB root hub driver; and
notifying, by the USB driver, the power manager and an Internet Protocol (IP) stack of the power status of the USB network-device.

11. The method of claim 8, further comprising:
when there is the transition to the host suspend mode, informing, by the power manager, all applications of the host suspend mode transition, and delivering the SetPower notification message of instructing the power off status (D3) transition, to the USB driver.

12. The method of claim 8, wherein the host is a computer equipped with a Windows Operating System (OS).

13. The method of claim 8, wherein the USB network-device is a terminal comprising at least one of an Institute of Electrical and Electronics Engineers (IEEE) 802.16-based communication modem, a Digital Multimedia Broadcasting (DMB) receiving modem, and a High Speed Downlink/Uplink Packet Access (HSDPA/HSUPA) communication modem.

14. A method for an operation of a power manager in a host equipped with a Universal Serial Bus (USB) network-device, the method comprising:
sending a host suspend mode notification message to a status manager when there is a transition to a host suspend mode, the status manager configured to instruct a USB driver to transition to a normal status (D0) in response to the host suspend mode notification message;
receiving a report that a power status of the USB network-device is equal to a normal status (D0), from the USB driver; and
sending, upon receiving the report from the USB driver, a SetPower notification message to the USB driver, and controlling a transition of the power status of the USB network-device to a power off status (D3).

15. The method of claim 14, further comprising, if the host resumes in a normal mode, delivering a host awake notification message to the status manager.

16. The method of claim 14, further comprising:
if the host resumes in a normal mode:
delivering a SetPower notification message of instructing a normal status (D0) transition, to the USB driver; and
receiving a report that a power status of the USB network-device is equal to a normal status (D0), from the USB driver.

17. The method of claim 14, wherein the USB network-device is a terminal comprising at least one of an Institute of Electrical and Electronics Engineers (IEEE) 802.16-based communication modem, a Digital Multimedia Broadcasting (DMB) receiving modem, and a High Speed Downlink/Uplink Packet Access (HSDPA/HSUPA) communication modem.

18. A method for use in a host equipped with a Universal Serial Bus (USB) network-device, the method comprising:
sending, at a status manager, a status transition message instructing a USB driver to transition to a normal status (D0) upon receiving a host suspend mode notification message;
notifying, by the USB driver, a power manager of the status transition to the normal status (D0); and
sending, by the power manager, a SetPower notification message to the USB driver to power off upon receiving the notification from the USB driver of the status transition to a normal status (D0).

19. The method of claim 18, further comprising receiving a host awake notification message from the power manager when the host resumes in a normal mode.

20. The method of claim 18, wherein the USB network-device is a terminal comprising at least one of an Institute of Electrical and Electronics Engineers (IEEE) 802.16-based communication modem, a Digital Multimedia Broadcasting (DMB) receiving modem, and a High Speed Downlink/Uplink Packet Access (HSDPA/HSUPA) communication modem.

* * * * *